United States Patent [19]
Gerber

[11] Patent Number: 4,795,205
[45] Date of Patent: Jan. 3, 1989

[54] WINDSHIELD FOR GOLF CART

[75] Inventor: Curtis E. Gerber, Tampa, Fla.

[73] Assignee: Tampa G Manufacturing Co., Tampa, Fla.

[21] Appl. No.: 131,981

[22] Filed: Dec. 11, 1987

[51] Int. Cl.$^4$ ............................................. D62J 17/00
[52] U.S. Cl. ............................. 296/77.1; 280/DIG. 5; 296/84.1
[58] Field of Search ............... 296/78 R, 79, 83, 84 R, 296/84 A, 84 D, 84 G; 280/DIG. 5; 49/197, 449

[56] References Cited

U.S. PATENT DOCUMENTS

| | | | |
|---|---|---|---|
| 2,094,940 | 5/1936 | Burdo | 49/197 X |
| 2,323,161 | 9/1940 | Stouffer | 49/197 X |
| 3,992,816 | 11/1976 | Skahill | 49/197 |
| 4,014,589 | 3/1977 | Yerkey | 296/78 R |
| 4,332,415 | 6/1982 | Williams | 280/DIG. 5 X |
| 4,488,750 | 12/1984 | Gerber | 49/197 X |
| 4,621,859 | 11/1986 | Spicher | 296/78 R |

Primary Examiner—Robert B. Reeves
Assistant Examiner—John Gruber
Attorney, Agent, or Firm—Dominik, Stein, Saccocio, Reese, Colitz & Van Der Wall

[57] ABSTRACT

A windshield assembly for a golf cart comprising horizontal upper tracks located in the upper portion of a golf cart; vertical lower tracks extending downwardly from the upper tracks and supported by the lower portion of the golf cart at the front thereof with junctions being formed at the area where the upper and lower tracks are joined; a windshield having an upper pair of rollers slidable in the upper tracks and a lower pair of rollers slidable in the lower tracks; wall means, downwardly extending from the upper tracks to retain the rollers within the tracks; pin means spring urged into the track means to preclude movement of the rollers therepast, the pin means being retractable to allow movement of the rollers therepast, and brackets for supporting the upper and lower tracks in operative contact with each other, each bracket including a vertical base plate and inwardly projecting supports to maintain the tracks in contact with each other at an angle slightly greater than forty-five (45) degrees with the tracks themselves constituting uninterrupted entire riding surfaces for the rollers within the track, each bracket further including a plate parallel with the direction of movement of the rollers and having a notch formed therein for receiving a bent portion of a pin to thereby hold the pin in its retracted position, the pin being movable into the tracks adjacent to the junction.

4 Claims, 2 Drawing Sheets

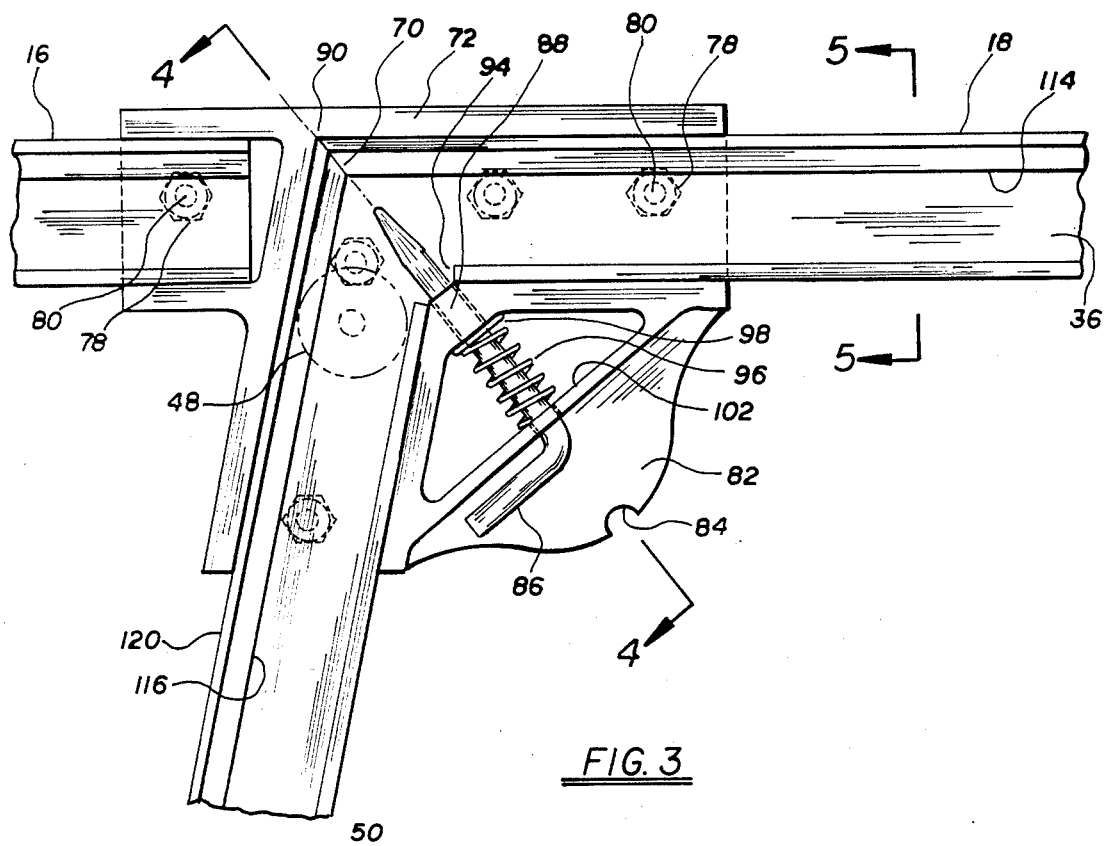
FIG. 3
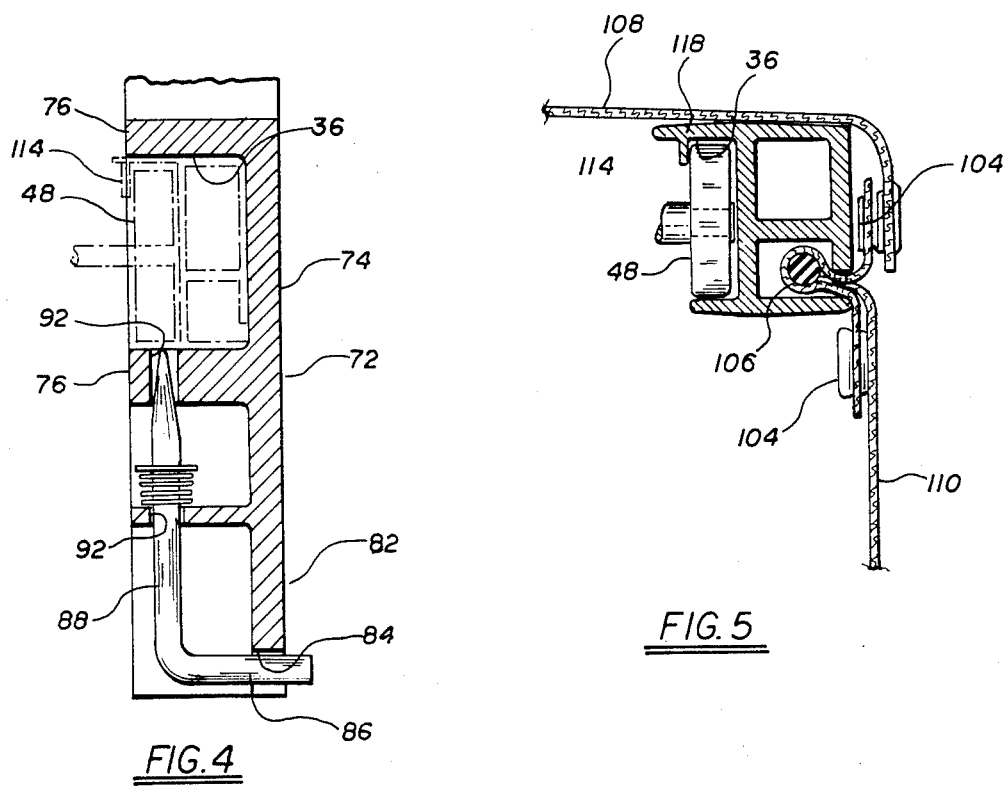
FIG. 4
FIG. 5

WINDSHIELD FOR GOLF CART

BACKGROUND OF THE INVENTION

This invention relates to golf carts and, more particularly, to improved windshields for golf carts.

DESCRIPTION OF THE BACKGROUND ART

During a round of golf, several miles are normally traveled by a player. Because of such great distances, there has been an increase in the use of motorized vehicles, golf carts. Golf carts are also desirable because they speed players through the golf course to thereby make the golf course and the game more available to greater numbers of players.

Golf carts are becoming increasingly popular and their utility is even extending to use as local transportation, particularly in residential communities which have be built in the vicinity of a golf course. They are also being used for short trips to shopping plazas and places other than the golf courses for which they had originally been intended. In addition, golf carts are normally electrically powered which makes them ecologically preferred over more conventional sources of transportation.

Because of their light weight construction, a golf cart generally protects its riders from the weather by either flexible covers, lightweight plastic screens or the like. The need to have some type of weather protection from the wind and the rain is obvious. However, the prior art devices for affording such protection have been attendant with several short comings.

The adjustable windshield of the present invention overcomes many of the known short comings of the prior art golf carts by providing a simple and low cost device that is easily moved from a first, operative or lower position in which the shield will deflect the wind and/or rain from the riders to a second, inoperative or upper position in which the windshield is stored parallel with the roof above the riders for increased enjoyment of the outdoors.

Various approaches are disclosed in the literature to improve golf carts, particularly their windshields. By way of example, note U.S. Pat. No. 4,013,315 issued to West for a "Rain Curtain Assembly For Golf Carts"; U.S. Pat. No. 4,343,503 issued to Samuelson et al for a "Snap-On Windshield For Golf Carts And Like Vehicles"; U.S. Pat. No. 3,958,826 issued to Upton for a "Windshield For Golf Carts"; U.S. Pat. No. 4,014,589 issued to Yerkey for a "Portable Windshield For A Riding Type Golf Cart"; U.S. Pat. No. 4,621,859 issued to Spicher for a "Weathershield For Golf Cart And A Method Of Enclosing A Golf Cart"; U.S. Pat. No. 4,098,53 issued to Mills for a "Weathershield For Golf Carts"; U.S. Pat. No. 3,709,553 issued to Churchill et al. for a "Golf Cart Rain Coat"; U.S. Pat. No. 4,488,750 issued to Gerber for an "Adjustable Windshield For A Vehicle"; U.S. Pat. No. 1,505,955 issued to Herron for a "Vehicle Top"; U.S. Pat. No. 3,829,152 issued to Hobbs for a "Vehicle Windshield Assembly"; U.S. Pat. No. 1,294,241 issued to Crossley for a "Wind Shield"; U.S. Pat. No. 1,403,488 issued to Crowell for a "Windhhield For Vehicles"; U.S. Pat. No. 1,944,160 issued to Barker for a "Windshield"; U.S. Pat. No. 3,894,305 issued to Krenzler for a "Boat Windshield"; U.S. Pat. No. 2,141,442 issued to Mead et al. for a "Ventilator"; U.S. Pat. No. 1,607,489 issued to Springstead for a "Protector For Windshields".

Although many such advances are noteworthy to one extent or another, none achieves the objectives of an efficient, reliable, inexpensive, convenient to use windshield designed to accommodate the needs of a wide variety of golf carts.

As illustrated by the great number of prior patents and commercial devices, efforts are continuously being made in an attempt to improve adjustable golf cart windshields to render them more efficient, reliable, inexpensive and convenient to use. None of these previous efforts, however, provides the benefits attendant with the present invention. Additionally, prior golf cart windshields do not suggest the present inventive combination of component elements arranged and configured as disclosed and claimed herein. The present invention achieves its intended purposes, objects and advantages over the prior art devices through a new, useful and unobvious combination of component elements, with the use of a minimum number of functioning parts, at a reasonable cost to manufacture, and by employing only readily available materials.

Therefore, it is an object of this invention to provide an improved windshield assembly for a golf cart comprising generally horizontal upper tracks located in the upper portion of a golf cart; generally vertical lower tracks extending downwardly from the upper tracks and supported by the lower portion of the golf cart at the front thereof with junctions being formed at the area where the upper and lower tracks are joined; a windshield having an upper pair of rollers slidable in the upper tracks and a lower pair of rollers slidable in the lower tracks; wall means, downwardly extending from the upper tracks to retain the rollers within the tracks; pin means spring urged into the tracks to preclude movement of the rollers therepast, the pin means being retractable to allow movement of the rollers therepast, and brackets for supporting the upper and lower tracks in operative contact with each other, each bracket including a vertical base plate and inwardly projecting supports to maintain the tracks in contact with each other at an angle slightly greater than forty-five (45) degrees with the tracks themselves constituting uninterrupted entire riding surfaces for the rollers moving within the track, each bracket further including a plate parallel with the direction of movement of the rollers and having a notch formed therein for receiving a bent portion of a pin to thereby hold the pin in its retracted position, the pin being movable into the tracks adjacent to the junction.

It is another object of this invention to simplify the design of the hardware used for supporting adjustable windshields in golf carts and, as a result, decrease their cost.

It is a further object of the invention to render golf carts with adjustable windshields more efficient, reliable and convenient to use when shifting the windshields between a lowered operative and a raised inoperative positions.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the invention may be incorporated into an improved windshield assembly for a golf cart comprising generally horizontal upper tracks located in the upper portion of a golf cart; generally vertical lower tracks extending downwardly from the upper tracks and supported by the lower portion of the golf cart at the front thereof with junctions being formed at the area where the upper and lower tracks are joined; a windshield having an upper pair of rollers slidable in the upper tracks and a lower pair of rollers slidable in the lower tracks; wall means, downwardly extending from the upper tracks to retain the rollers within the tracks; pin means spring urged into the tracks to preclude movement of the rollers therepast, the pin means being retractable to allow movement of the rollers therepast, and brackets for supporting the upper and lower tracks in operative contact with each other, each bracket including a vertical base plate and inwardly projecting supports to maintain the tracks in contact with each other at an angle slightly greater than forty-five (45) degrees with the tracks themselves constituting uninterrupted entire riding surfaces for the rollers moving within the track, each bracket further including a plate parallel with the direction of movement of the rollers and having a notch formed therein for receiving a bent portion of a pin to thereby hold the pin in its retracted position, the pin being movable into the tracks adjacent to the junction.

The lower tracks include downwardly extending walls for retaining the rollers within the lower tracks. The walls of the upper and lower tracks are formed as continuations of each other.

The invention may also be incorporated into improved golf cart having a lower portion with a chassis, seat, wheels, and motor and having an upper portion with a windshield assembly and associated mechanisms, the windshield assembly being movable from an operative position in front of the seats to an inoperative position above the seats, the windshield assembly comprising a generally horizontal upper tracks located in the upper portion of a golf cart; generally vertical lower tracks extending downwardly from the upper tracks and supported by the lower portion of the golf cart at the front thereof with junctions being formed at the area where the upper and lower tracks are joined; a windshield having an upper pair of rollers slidable in the upper tracks and a lower pair of rollers slidable in the lower tracks; wall means, downwardly extending from the upper tracks to retain the rollers within the tracks; pin means spring urged into the track means to preclude movement of the rollers therepast, the pin means being retractable to allow movement of the rollers therepast, and brackets for supporting the upper and lower tracks in operative contact with each other, each bracket including a vertical base plate and inwardly projecting supports to maintain the tracks in contact with each other at an angle slightly greater than forty-five (45) degrees with the tracks themselves constituting uninterrupted entire riding surfaces for the rollers moving within the track, each bracket further including a plate parallel with the direction of movement of the rollers and having a notch formed therein for receiving a bent portion of a pin to thereby hold the pin in its retracted position, the pin being movable into the tracks adjacent to the junction.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 3 is an enlarged side elevational view showing the components of the windshield and supporting elements as shown in FIGS. 1 and 2;

FIG. 4 is a sectional view taken along line 4—4 of FIG. 3 showing the locking mechanism and associate mechanisms; and FIG. 5 is a sectional view taken along line 5—5 of FIG. 3 showing a roller and associated mechanisms and parts.

Similar referenced characters refer to similar parts throughout the several Figures.

DETAILED DESCRIPTION OF THE INVENTION

Figure 1:
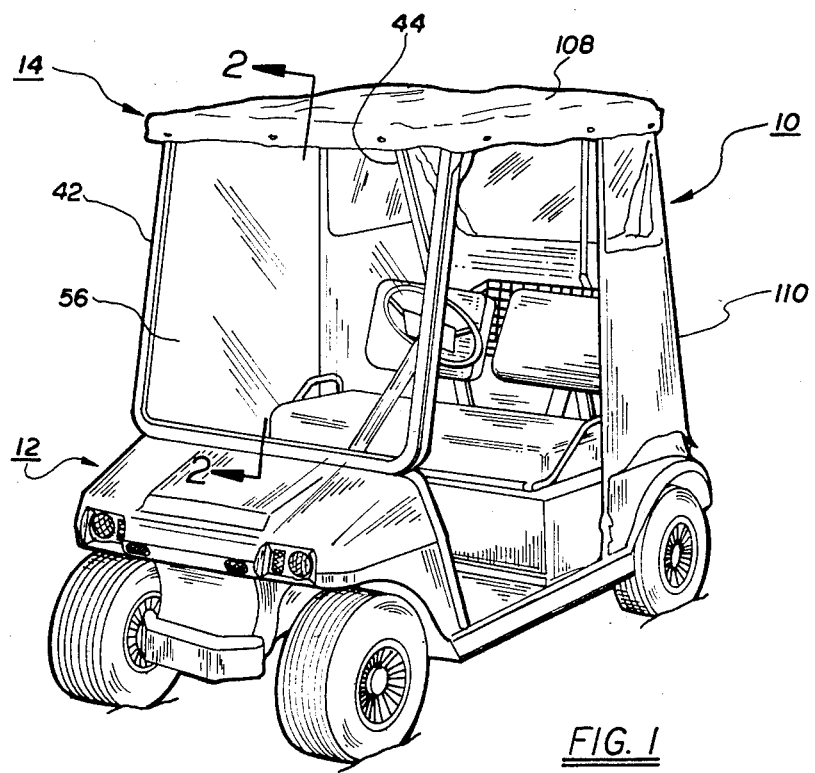
FIG. 1 is a perspective illustration of a golf cart equipped with the adjustable windshield of the present invention.
Figure 2:
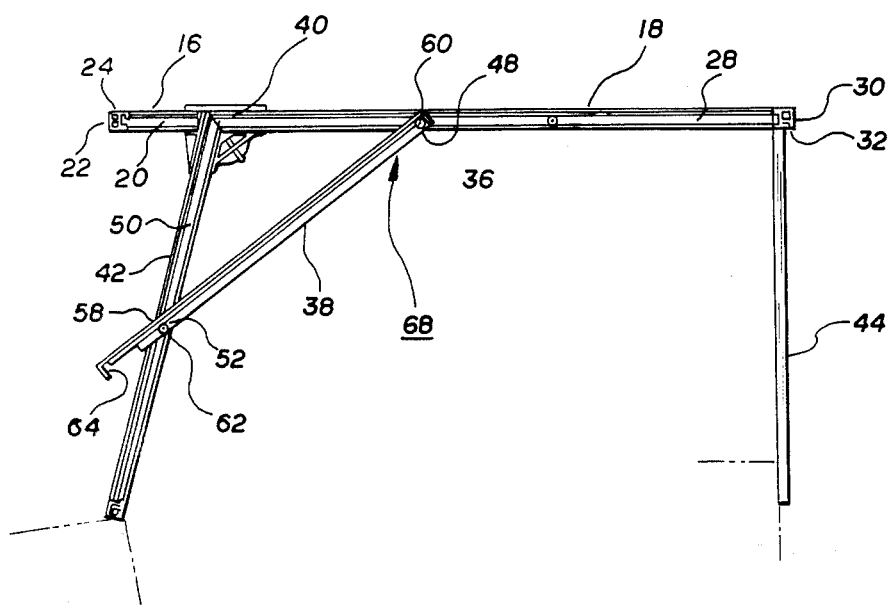
FIG. 2 is a sectional view taken along line 2—2 of FIG. 1 showing the adjustable windshield and its supporting structures constructed in accordance with the principles of the present invention.

With reference to FIG. 1, there is shown a golf cart 10 which is conventional in its lower portion 12 thereof including the chassis, seat, wheels, etc. as well as the motor which is normally of the ecologically preferred, battery driven variety. The upper portion 14, however, differs from all prior golf carts in several significant aspects.

The upper portion includes, at its uppermost region, two mating extrusions 16 and 18, bent into facing C-shaped configurations located in a generally horizontal plane. The forward C-shaped extrusion 16 is provided with short, rearwardly extending, longitudinal legs 20 and a front cross piece 22 coupled together by front curved portions 24. The rearward C-shaped extrusion 18 is provided with long, forwardly extending, longitudinal legs 28 and a rear cross piece 30 coupled together by rear curved portions 32. The longitudinal legs of the rearward C-shaped extrusion have a cross-section to form generally horizontal upper tracks 36 which define the path of travel for the upper portion of the windshield 38 mounted for movement therein. The mating extrusions 16 and 18, taken together, form a roof frame 40.

Downwardly extending pairs of legs 42 add 44, front and back, couple the roof frame 40 to the lower portion 12 of the golf cart 10. Nuts and bolts or other releasable securement means are employed to effect the coupling.

The upper tracks 36 of the roof frame 40 are arranged in parallel relationship and define tracks for slideably receiving the upper rollers 48 of the windshield 38. The legs 20 of the forward C-shaped extrusion 16 may also be formed as tracks, but do not function in the raising or lowering of the windshield 38.

The front, generally vertical, lower legs 42 are also formed to constitute tracks 50. These tracks are formed with a cross-sectional configuration similar to the cross-sectional configuration of the upper tracks for the receipt of the lower rollers 52 of the windshield for movement therein.

The windshield is actually an assembly which includes the transparent window 56 and metallic supports 58, top, bottom and sides for rigidity and safety. It is these side supports which, at their upper and lower ends, rotatably secure pairs of upper and lower rollers 48 and 52 on shaft 60 and 62 for riding in their upper 36 and lower 50 tracks. The lower portion of the window has an additional piece of metal formed as an inwardly extending flange 64 which constitutes a handle by which a rider may grasp the window to raise or lower it. The windshield with its rollers along with the tracks and their supporting hardware constitute the windshield assembly 68.

The front, generally vertical, lower tracks and the horizontal, upper tracks are mated with a miter cut at an angle slightly greater than forty-five (45) degrees to form a junction 70. The upper tracks and the lower tracks are preferably cut at equal angles of slightly less than twenty-two and a half (22½) degrees. The upper rollers 48 may thus move forwardly to rest at the upper end of the lower tracks 50 adjacent to the junction 70. When so positioned, the windshield is closed for protection from the weather. In this lower, closed or operative position of the windshield, the lower rollers 52 are at the lower extent of the lower tracks 50.

Upon lifting the window upwardly, the upper rollers 48 will move rearwardly and the lower rollers 52 will move upwardly until the lower rollers rest in the forward end of the upper tracks 36 adjacent to the junction 70. When so positioned, the windshield is open for enjoyment of the weather. In this position, the upper roller are at the rearward end of the upper tracks and the windshield is in the upper, open, or inoperative position.

The tracks are supported in position with respect to each other by cast brackets 72. The brackets are each formed to include a vertical base 74 and inwardly projecting supports 76 to maintain the tracks in contact with each other at an angle slightly greater then forty-five (45) degrees with the tracks themselves constituting an uninterrupted entire riding surface for the rollers 48 and 52 moving within the track. Each bracket 72 includes nuts and bolts 78 and 80 for coupling with the associated tracks and forward C-shaped extrusion. Each bracket 72 further includes a plate 82 parallel with the direction of movement of the rollers. Each plate has a notch 84 formed therein for receiving a bent portion 86 of a pin 88 to thereby hold the pin in its retracted position. Note FIG. 4. The pin being movable into the tracks adjacent to the junction, as shown in FIG. 3, to thereby spring urge the pin into its advanced position.

In the prior art devices, a cast bracket was provided for each junction to constitute the support between the upper and lower track.. Such brackets included guide surfaces formed as a curved part of each bracket to function as an extension of the tracks to guide the rollers for movement between the upper and lower tracks. Such guide surfaces were located within the tracks and constituted interference members for the rollers to guide their movement. It has been found, however, that such guide surfaces may be eliminated and their function dispensed with. The upper and lower tracks may thus butt or join together along their entire common angled line to form uninterrupted tracks, even at their remote edges 90, and still retain the smooth sliding function during opening and closing of the windshield assembly. This elimination of a part with its accompanying function results in a decreased fabrication cost with no loss of performance.

In accordance with the present invention the pin 88 is mounted in bracket apertures at each junction and extends through the casting and a break 94 in the tracks. It is mounted for movement parallel with the junction 70. A spring 96 encompasses the pin 88 and resiliently urges it across the tracks at the junction. A washers secured to the pin and a bracket wall 102 define the location of the pin.

A one-part plate 82 for pin retention purposes includes a single surface with a notch 84 for receiving a bend of the pin when in the retracted position and rotated ninety (90) degrees. This again reduces cost with no loss of performance over prior att devices. One pin 88 is provided at each junction and is movable rearwardly by a rider and spring-urged forwardly by expansion between the washer 98 and wall 102. With the pins in the outward or retracted position, as shown in FIG. 4, the windshield may be raised or lowered. In their forward or inserted positions, as shown in FIG. 3, the pins may rest above the upper rollers 48 at the upper ends of the lower tracks. Such pin positioning also functions to preclude inadvertent closing of the windshield 38 when located entirely in the upper tracks 36. With the windshield in one position, the pins may be pivoted and sprung forward to preclude movement of the windshield to the other position.

Analogous plates of the prior art devices included complex mechanisms with pairs of spaced, parallel interference members. When pulled outwardly and rotated, bends in the pins would contact either of the two parallel interference members to allow the retaining of the pin in the retracted position and the opening and the closing of the windshield assembly.

Lastly, the tracks for defining the path of the movement of the rollers in the prior art devices had vertical retention walls extruded with the various legs and extending upwardly from the lower portion of the tracks. Note FIG. 5 which also shows snaps 104 and other securement devices 106 for coupling a flexible roof 108 and side panels 110 to the golf cart. Such retention walls preclude the rollers from jumping out of their respective tracks. As a result of their lower orientations, the walls form wells whereby debris could readily accumulate. According to the present invention, however, the retention walls 114 and 116 are formed of plates which depend downwardly from the upper portions 118 and 120 of the tracks 36 and 50. This arrangement has been found to minimize accumulation of debris to thereby promote a smoother rolling of the rollers when opening or closing the windshield. The smoothness of the rolling is further improved since any utilized lubricant would otherwise promote the welling up of oily debris.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,
What is claimed is:

1. An improved windshield assembly for a golf cart comprising:

generally horizontal upper tracks located in the upper portion of a golf cart generally vertical lower tracks extending downwardly from the upper tracks and supported by the lower portion of the golf cart at the front thereof with junctions being formed at the area where the upper and lower tracks are joined;

a windshield having an upper pair of rollers slidable in the upper tracks and a lower pair of rollers slidable in the lower tracks, wall means, downwardly extending from the upper tracks to retain the rollers within the tracks;

pin means spring urged into the tracks to preclude movement of the rollers therepast, the pin means being retractable to allow movement of the rollers therepast, and brackets for supporting the upper and lower tracks in operative contact with each outer, each bracket including a vertical base plate and inwardly projecting supports to maintain the tracks in contact with each other at an angle slightly greater than forty-five (45) degrees with the tracks themselves constituting uninterrupted entire riding surfaces for the rollers moving within the track, each bracket further including a plate parallel with the direction of movement of the rollers and having a notch formed therein for receiving a bent portion of a pin to thereby hold the pin in its retracted position, the pin being movable into the tracks adjacent to the junction.

2. The windshield assembly as set forth in claim 1 wherein the lower tracks include horizontally extending walls for retaining the rollers within the lower tracks.

3. The windshield assembly as set forth in claim 2 wherein the walls of the upper and lower tracks are formed integrally with the tracks.

4. A golf cart having a lower portion with a chassis, seat, wheels, and motor and having an upper portion with a windshield assembly and associated mechanisms, the windshield assembly being movable from an operative position in front of the seats to an inoperative position above the seats, the windshield assembly comprising:

generally horizontal upper tracks located in the upper portion of a golf cart;

generally vertical lower tracks extending downwardly from the upper tracks and supported by the lower portion of the golf cart at the front thereof with junctions being formed at the area where the upper and lower tracks are joined;

a windshield having an upper pair of rollers slidable in the upper tracks and a lower pair of rollers slidable in the lower tracks, wall means, downwardly extending from the upper tracks to retain the rollers within the tracks;

pin means spring urged into the track means to preclude movement of the rollers therepast, the pin means being retractable to allow movement of the rollers therepast, and brackets for supporting the upper and lower tracks in operative contact with each other, each bracket including a vertical base plate and inwardly projecting supports to maintain the tracks in contact with each other at an angle slightly greater than forty-five (45) degrees with the tracks themselves constituting uninterrupted entire riding surfaces for the rollers moving within the track, each bracket further including a plate parallel with the direction of movement of the rollers and having a notch formed therein for receiving a bent portion of a pin to thereby hold the pin in its retracted position, the pin being movable into the tracks adjacent to the junction.

* * * * *